L. A. PROCHNOW.
FEEDER AND GRIT SEPARATOR.
APPLICATION FILED JAN. 26, 1911.
1,019,185.
Patented Mar. 5, 1912.
3 SHEETS—SHEET 1.
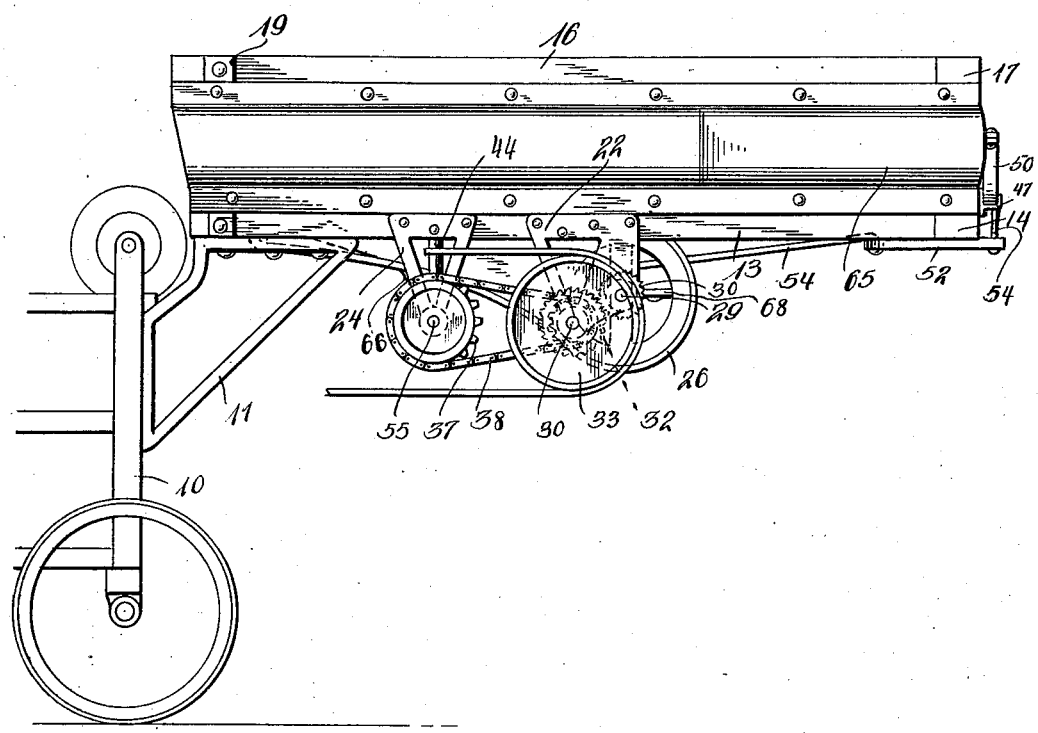
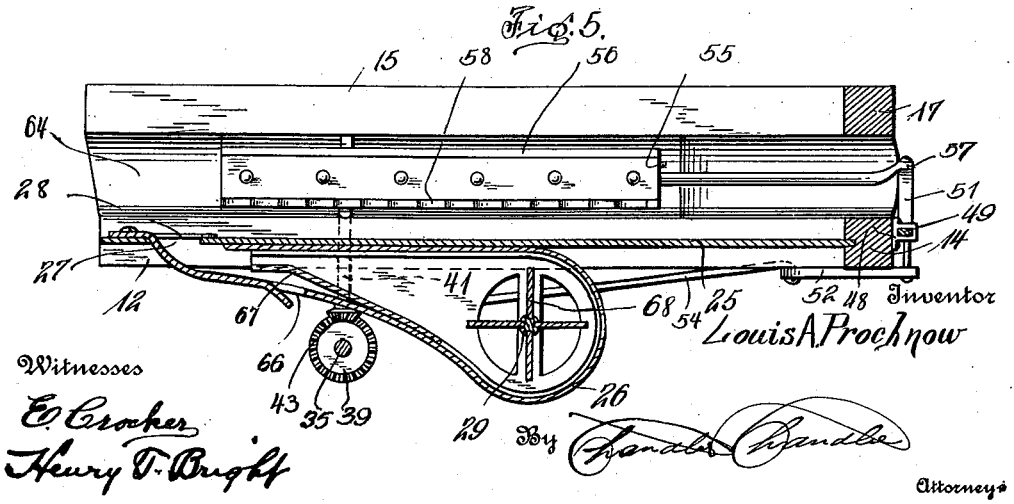

L. A. PROCHNOW.
FEEDER AND GRIT SEPARATOR.
APPLICATION FILED JAN. 26, 1911.
1,019,185.
Patented Mar. 5, 1912.
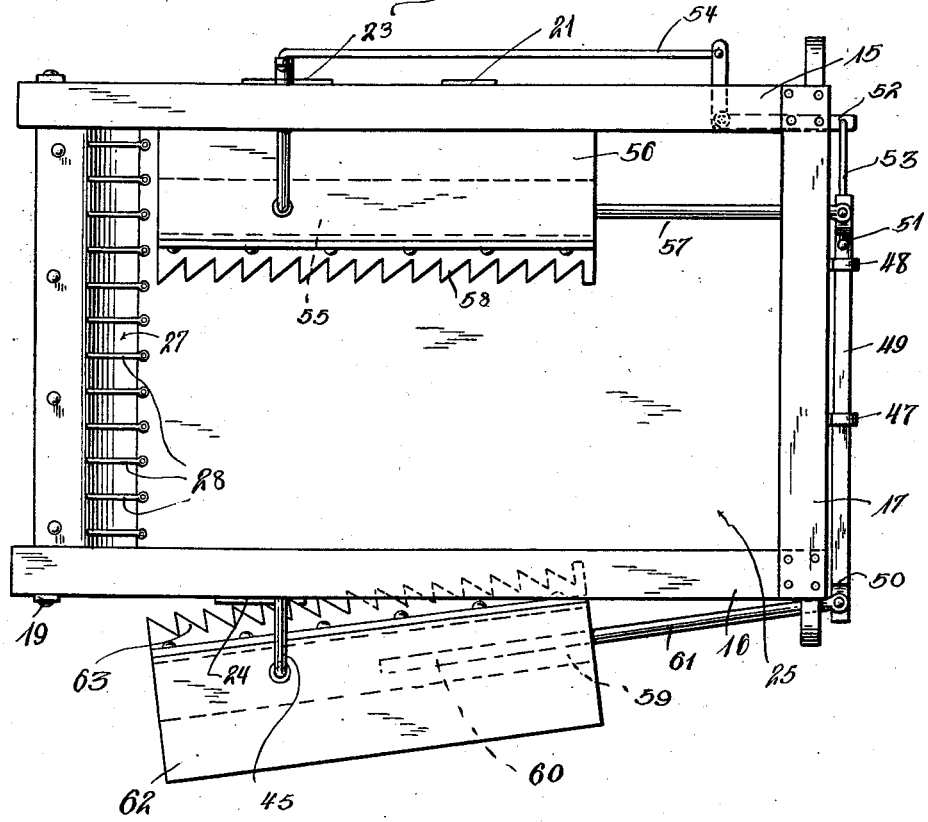
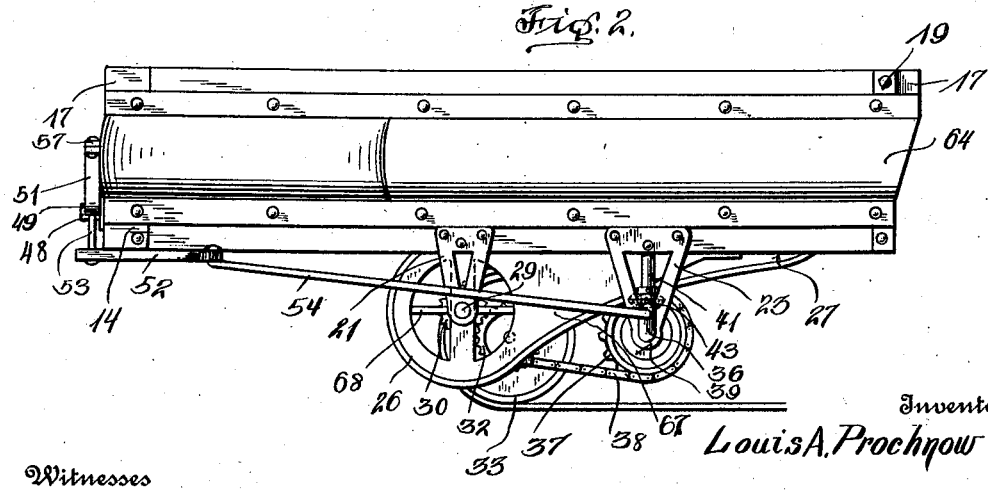

L. A. PROCHNOW.
FEEDER AND GRIT SEPARATOR.
APPLICATION FILED JAN. 26, 1911.
1,019,185.
Patented Mar. 5, 1912.
3 SHEETS—SHEET 3.
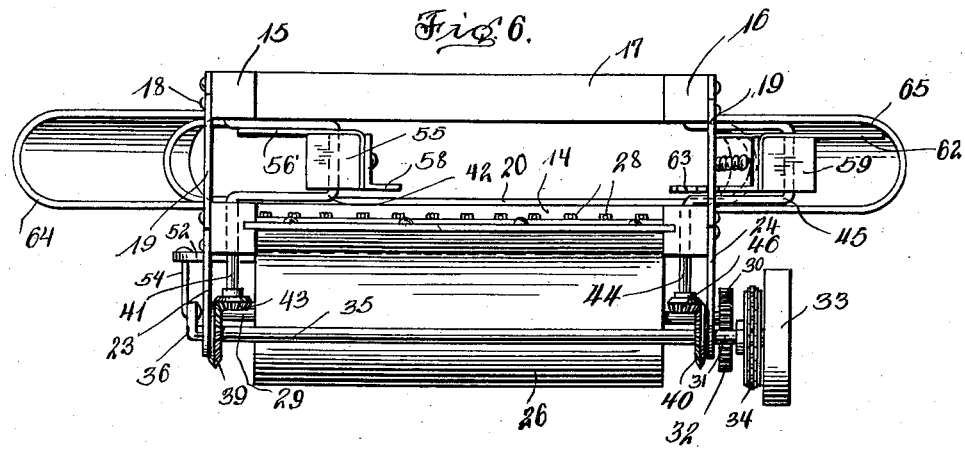
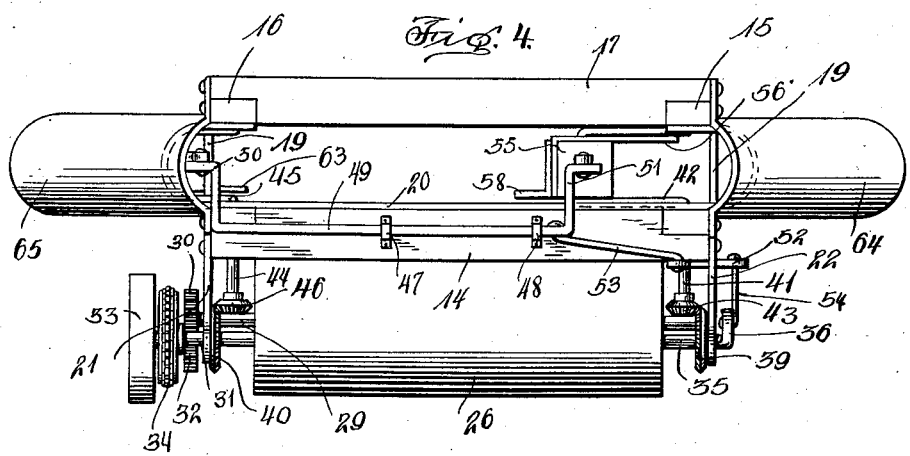
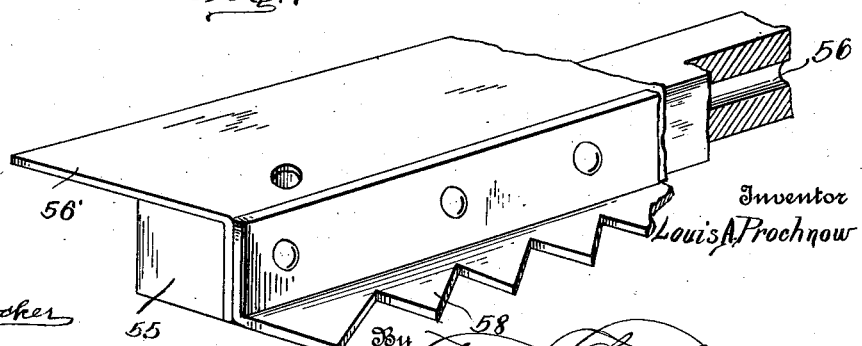

UNITED STATES PATENT OFFICE.

LOUIS A. PROCHNOW, OF ANN ARBOR, MICHIGAN.

FEEDER AND GRIT-SEPARATOR.

1,019,185.  Specification of Letters Patent.  Patented Mar. 5, 1912.

Application filed January 26, 1911. Serial No. 604,863.

*To all whom it may concern:*

Be it known that I, LOUIS A. PROCHNOW, a citizen of the United States, residing at Ann Arbor, in the county of Washtenaw, State of Michigan, have invented certain new and useful Improvements in Feeders and Grit-Separators; and I do hereby declare the following to be a full, clear, and exact description of the invention, such as will enable others skilled in the art to which it appertains to make and use the same.

This invention relates to feeders and grit separators, and particularly that type adapted to be associated with clover and bean threshers.

The object of the invention resides in the provision of a feeder and grit separator which is adapted to be easily associated with a clover or bean thresher for the purpose of effectively feeding the product to the thresher and separating all grit, stone or other foreign matter from the product before the latter passes to the cylinder of the thresher.

With the above and other objects in view, the invention consists in the details of construction and in the arrangement and combination of parts to be hereinafter more fully described and particularly pointed out in the appended claims.

In describing the invention in detail, reference will be had to the accompanying drawings, wherein like characters of reference denote corresponding parts in the several views; and in which, Figure 1 is a side elevation of a feeder and grit separator constructed in accordance with the invention, the same being shown attached to a thresher; Fig. 2, a view similar to Fig. 1 viewed from the opposite side; Fig. 3, a plan view of the feeder and grit separator with the casings which surround the feeding sweeps removed; Fig. 4, a rear view of the feeder and grit separator; Fig. 5, a section on the line 5—5 of Fig. 3; Fig. 6, a front view of the feeder and grit separator; and Fig. 7, a detail perspective view partly in section of one of the feeding sweeps.

Referring to the drawings 10 indicates the cylinder end of the threshing machine to which the improved feeder and grit separator is attached by means of suitable braces 11. This feeder and grit separator comprises a lower U shaped frame formed of side members 12 and 13 and a connecting member 14; and an upper U shaped frame formed of side members 15 and 16 and a connecting member 17. This upper frame is supported in spaced relation to the lower frame by means of uprights 18 and 19 connecting the free ends of their side arms respectively and by a C shaped member 20 which is positioned upon the lower frame transversely thereof and has its free ends connected to the inner ends of the side members 15 and 16 respectively of the upper frame. Mounted upon the side members 12 and 13 are alined journal brackets 21 and 22 respectively, while journal brackets 23 and 24 are also respectively mounted upon the side members 12 and 13 between the journal brackets 21 and 22 and the free ends of the side members 12 and 13. Supported in the lower frame between the side members 12 and 13 is a feeding pan 25 which extends from the connecting member 14 to a point slightly inward of the free ends of the side members 12 and 13. Also supported by the side members 12 and 13 of the lower frame beneath the feeding pan 25 is a casing 26 which extends toward the free ends of the side members 12 and 13 and terminates in a mouth 27 disposed between the free ends of the side members 12 and 13 and the adjacent end of the feed pan 25. This mouth is bridged by a plurality of strips 28 which are carried by the feed pan 25 and serve as a support for the material in its passage over the mouth to the cylinder of the thresher. Journaled in the brackets 21 and 22 is a shaft 29 which extends through the casing 26. One end of this shaft is extended beyond the bracket 22 and has fixed thereon a gear 30 for a purpose that will presently appear. Also journaled in the bracket 22 is a shaft 31 which has fixed thereon adjacent the bracket 22 a gear 32 in mesh with the gear 30 on the shaft 29. Also fixed on the shaft 31 in spaced relation from the gear 32 is a belt wheel 33 which is adapted for connection with a suitable source of power. Fixed on the shaft 31 between the belt wheel 33 and the gear 32 is a sprocket wheel 34. Journaled in the brackets 23 and 24 is a shaft 35 which has the end thereof adjacent the bracket 23 bent at right angles to form a crank arm 36 for a purpose that will presently appear. The end of this shaft 35 which is adjacent the bracket 24 is extended beyond said bracket and has fixed on said extended end a sprocket wheel 37 in alinement with the sprocket wheel 34 on the shaft 31, and a sprocket chain 38 travels on said sprocket wheels 34 and 37. By this construction, it will be apparent that as the shaft 31 is rotated, both the shaft 29 and the shaft 35 will also be rotated by reason of the various connections heretofore described.

Fixed on the shaft 35 just inward of the bracket 23 is a bevel gear 39, while a corresponding gear 40 is fixed on said shaft just inward of the bracket 34. Journaled between the side members 12 and 15 of the upper and lower frames in substantially the same vertical plane as the shaft 35 is another shaft 41 which has the central portion thereof disposed between the side members 12 and 13 offset to form a crank arm 42. The lower end of the shaft 41 is extended and has fixed thereon a bevel gear 43 which meshes with the bevel gear 39 on the shaft 35. Another shaft 44 is journaled in the side members 13 and 16 and likewise has the central portion thereof positioned between said side members offset to form a crank arm 45. The lower end of this shaft 44 is also extended through the side member 13 and has fixed thereon a bevel gear 46 which meshes with the bevel gear 40 on the shaft 35.

Mounted upon the connecting member 14 is a pair of guide members 47 and 48 in which is slidably mounted a bar 49. The terminals of this bar are bent upwardly and outwardly as at 50 and 51 respectively for a purpose that will presently appear. Pivoted on the under face of the side member 12 is an angle lever 52, one end of which is connected to the sliding bar 49 by means of a link 53, while the other end thereof is connected to the crank arm 36 of the shaft 35 by means of a link 54. Loosely mounted upon the crank arm 42 of the shaft 41 is one end of a bar 55, while the other end of said bar is provided with a longitudinal recess 56 in which is slidably mounted a rod 57. The outer end of this rod 57 is in turn pivotally connected to one end of the sliding bar 49. Secured to this bar 55 is a metal sheathing 56′ which extends across the inner side face of the bar and is then extended outwardly across the top thereof and serves to prevent the material being fed to the pan 25 from being caught between the outer side face of the bar 55 and the side members of the upper and lower frames. Mounted on the lower side face of the bar 55 is a plurality of teeth 58 directed toward the free end of the side arms of the upper and lower frames. Also loosely mounted on the crank arm 45 of the shaft 44 is one end of a bar 59 which has formed on its other end a longitudinally extending recess 60 wherein is slidably mounted a rod 61, the free end of which rod is pivotally connected to the end of the sliding bar 49 opposite that to which the rod 57 is secured. This bar 59 is also provided with a metal sheathing 62 which lies upon the inner side face of said bar 59 and is then extended laterally across the top of said bar for the same purpose as that heretofore attributed to the sheathing 56′. Also mounted on the inner side face of the bar 59 is a plurality of teeth 63 directed toward the free ends of the side members of the upper and lower frames. These bars 55 and 59 together with the sheathing and teeth mounted thereon form the feeding sweeps of the device.

As the shaft 35 is rotated, it will be apparent that the shaft 41 will in turn be rotated and by reason of the connection between the crank arm 42 and the feeding sweep formed by the bar 55, sheathing 56′ and teeth 58, said feeding sweep will be moved both laterally and longitudinally of the feeding pan 25. It will also be apparent that the stroke of the feeding sweep just mentioned toward the delivery end of the feeding pan will be made when said feeding sweep is disposed inwardly of the adjacent side edge of said feeding pan and such stroke will of course effect the movement of the material toward the delivery end of the feeding pan and across the mouth of the casing 27 as a result of the engagement of the teeth 58 with said material. During these movements of the feeding sweep, it will also be obvious that the sliding bar 49 by reason of its connection with the shaft 35 will cause the rear end of the bar 55 to be shifted transversely of the feeding pan 25 in unison with the shifting of the forward end of said bar as the result of the connection of same with the crank arm. This freedom of movement of the inner end of the bar 55 is permitted by reason of the sliding connection between said bar and the rod 57. The movements of the feeding sweep formed by the bar 59, sheathing 62 and teeth 63 are relatively the same as those made by the feeding sweep formed by the bar 55, sheathing 56′ and teeth 58. However, the connections between the feeding sweep formed by the bar 59, sheathing 62 and teeth 63 and the shaft 35 are arranged so that when one of the feeding sweeps heretofore described is partaking of certain movement, the other feeding sweep will be partaking of the opposite movement.

Supported by the side members 12 and 15 and extending laterally therefrom is a hood 64 into and out of which the feeding sweep formed by the bar 55, sheathing 56′ and teeth 58 is adapted to move. Supported by the side members 14 and 16 is another hood 65 into and out of which the feeding sweep formed by the bar 59, sheathing 62 and teeth 63 is adapted to move. Formed in the lower side of the casing 26 and extending transversely thereof is an opening 66, and communication between the rear portion of the casing 26 and this opening 66 is shielded by means of a tongue 67. The purpose of this opening 66 is to permit the grit which falls into the mouth of the casing to pass through said opening and be discharged upon the ground, while the tongue 67 prevents such grit from reaching the rear portion of the casing and coming in contact with a fan 68 mounted upon the shaft 29, said fan serving to direct a blast of air through the mouth 27 of the casing and prevent the desirable portions of the material from passing into said mouth.

What is claimed is:—

1. In a device of the character described, the combination of a frame, a feed pan supported by said frame, a vertical shaft mounted in said frame, a crank arm on said shaft, a feeding sweep having one end pivotally connected to said crank arm, whereby the movement of said crank arm will effect a movement of one end of the feed sweep longitudinally and transversely of the feed pan, means for effecting a movement of the other end of the feeding sweep transversely of the feed pan similar to the movement of the first named end of the feeding sweep under the influence of the crank arm on said vertical shaft and means for rotating said vertical shaft.

2. In a device of the class described, the combination of a frame, a feed pan supported by said frame, a vertical shaft mounted in said frame, a bar mounted on said frame for a sliding movement transversely of the latter, a crank arm on said shaft, a feeding sweep having one end pivotally connected to said crank arm, connections between the other end of said feeding sweep and the sliding bar, whereby the movements of said bar effect a movement of the last named end of the feeding sweep transversely of the feed pan similar to the movement of the first named end of the feeding sweep under the influence of the crank arm on said shaft, and means for effecting the simultaneous rotation of the shaft and sliding of the bar.

3. In a device of the class described, the combination of a frame, a feed pan supported by said frame, a pair of vertical shafts mounted in said frame, a bar mounted on said frame for a sliding movement transversely of the latter, a crank arm on each of said shafts, a pair of feeding sweeps each having one arm connected to a respective crank arm of one of said shafts, connections between the other end of each feeding sweep and the adjacent end of the sliding bar, whereby the movements of said bar will effect a movement of the last named end of each feeding sweep transversely of the feed pan similar to the movement of the first named end of each feeding sweep under the influence of the crank arm to which said feeding sweep is pivoted, and means for effecting the simultaneous rotation of each of said shafts and sliding of the bar.

In testimony whereof, I affix my signature, in presence of two witnesses.

LOUIS A. PROCHNOW.

Witnesses:
WM. F. PROCHNOW,
H. A. WILLIAMS.

Copies of this patent may be obtained for five cents each, by addressing the "Commissioner of Patents, Washington, D. C."